United States Patent Office 3,162,063
Patented Dec. 22, 1964

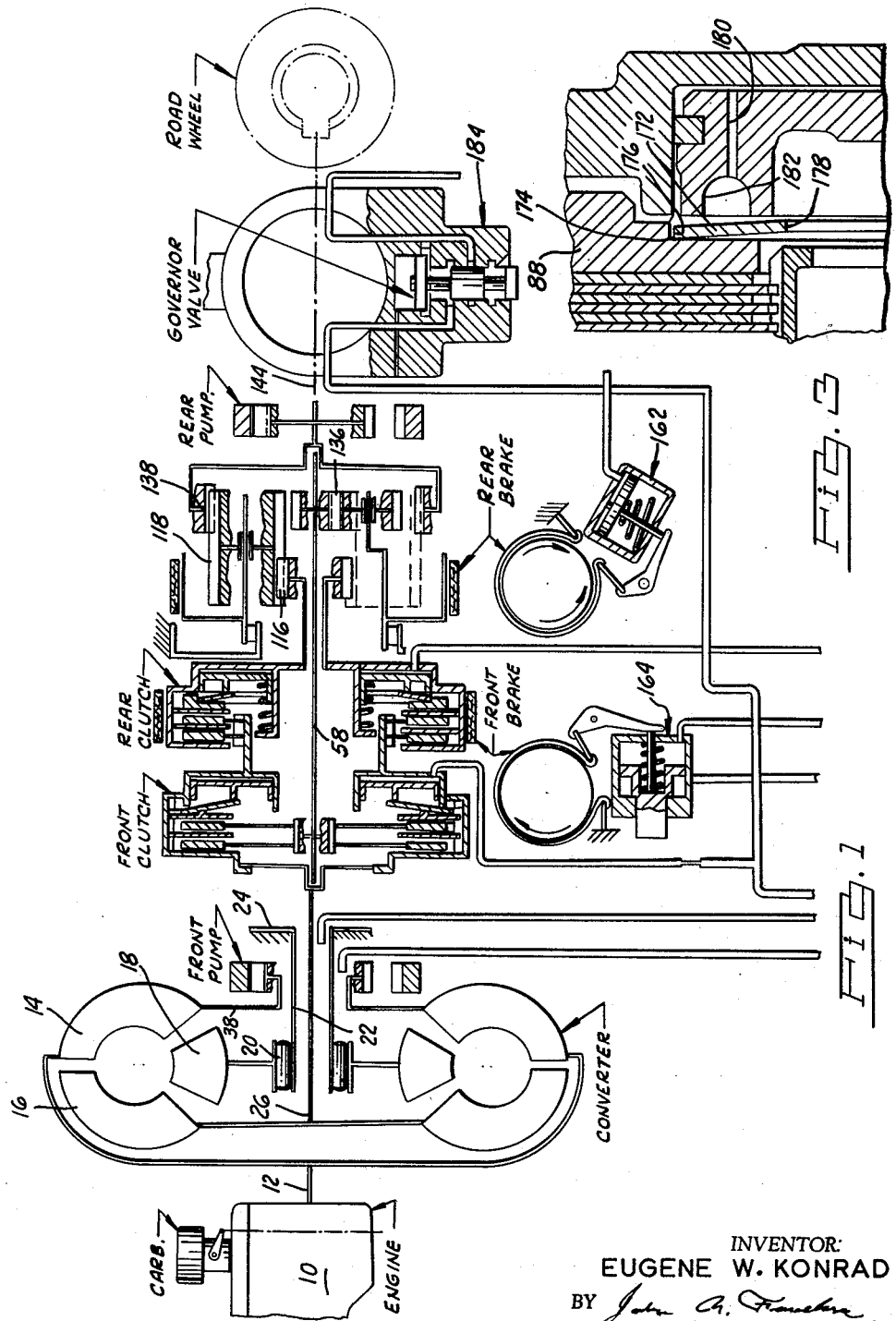

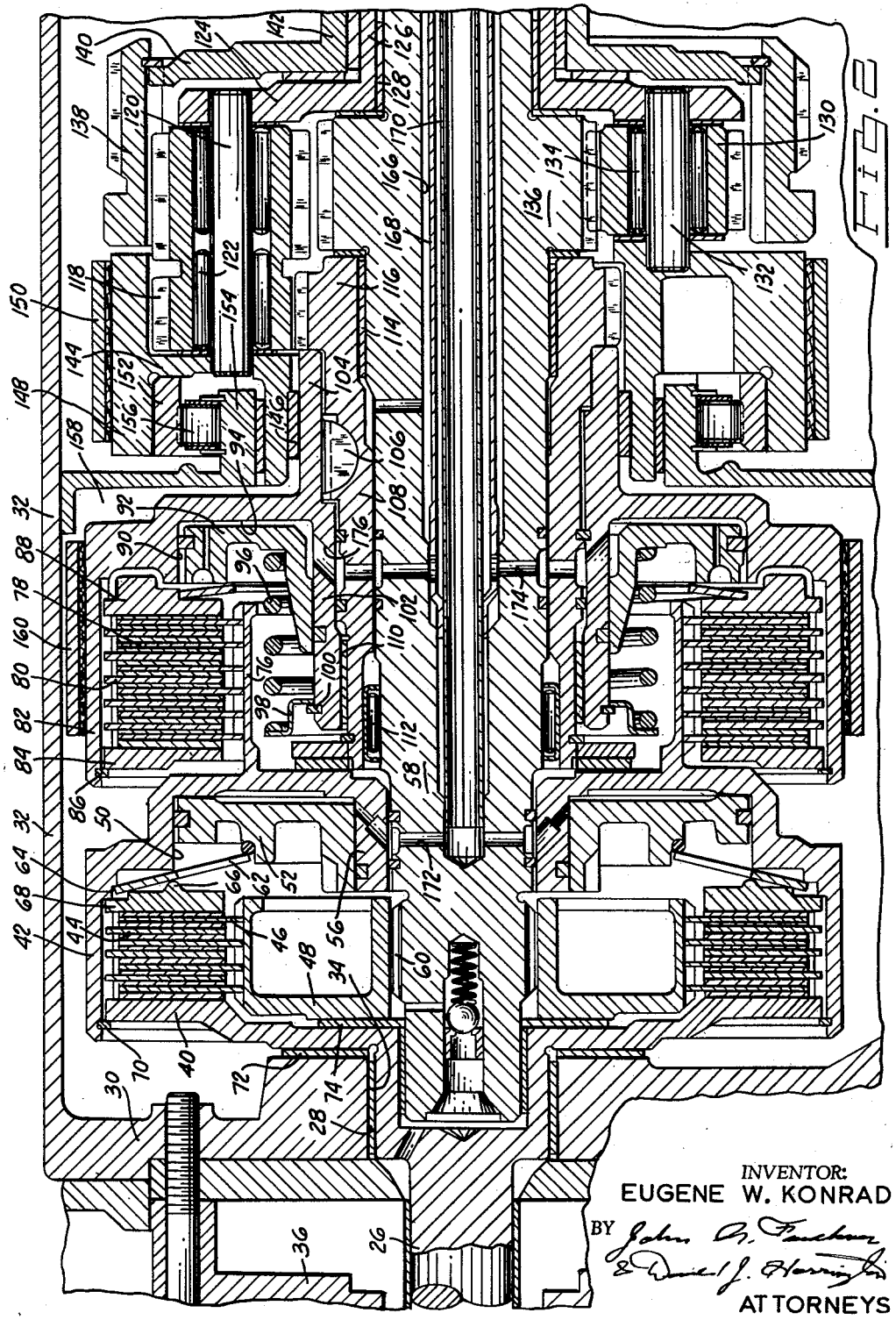

3,162,063
GEARING WITH FLUID PRESSURE OPERATED
FRICTION CLUTCH
Eugene W. Konrad, Northville, Mich., assignor to Ford Motor Company, Dearborn, Mich., a corporation of Delaware
Filed Mar. 18, 1963, Ser. No. 265,810
1 Claim. (Cl. 74—763)

My invention relates generally to torque transmitting mechanisms, and more particularly to a fluid pressure operated clutch and servo for use in a power transmission mechanism having geared torque delivery elements.

I contemplate that my invention can be adapted readily for use in an automobile vehicle power transmission mechanism having a planetary gear unit with clutch and brake means for controlling the rates of relative motion of the members of the gear unit.

One operating environment of my invention includes a multiple speed ratio gear unit having a driven element thereof connected to a power delivery shaft. A first power input element of the gear unit is connected to a driving member by means of a selectively engageable friction clutch. The driving member may consist of a turbine shaft that is connected to a turbine of a hydrokinetic torque converter unit. A second selectively engageable friction clutch is provided for establishing a driving connection between a second power input element of the gear unit and the turbine shaft. A first selectively engageable friction brake means is provided for anchoring the second power input element of the gear unit in sequence with the operation of the second friction clutch to establish a speed ratio change.

The reaction element of the gear unit may be connected by means of an overrunning coupling to the stationary transmission housing. The overrunning coupling is capable of delivering driving torque reaction to the housing in one direction, although freewheeling motion of the reaction element in the opposite direction is permitted. A second friction brake means may be provided for anchoring the reaction element to inhibit rotation of the same in that opposite direction.

The gear unit is capable of providing three forward driving speed ratios and a single reverse speed ratio. During operation in each of the forward driving speed ratios, the first friction clutch means is energized continuously. The second friction clutch means is operated by a clutch servo that comprises an annular cylinder within which is disposed an annuular piston. The cylinder and piston rotate with the rotatable clutch structure and cooperate to define a fluid pressure chamber. There is a tendency, therefore, for the clutch servo to develop a centrifugal pressure that will be of significant magnitude during operation at high speeds.

If the transmission mechanism is conditioned for operation in a speed ratio that does not require engagement of the second friction clutch, a centrifugal pressure build-up in the second friction clutch servo will produce an undesirable lock-up condition which will require slipping of the associated clutch discs. For example, if a speed ratio change from a high speed ratio to an underdrive speed ratio is desired, provision is made for exhausting fluid pressure from the second clutch servo. At the same time the friction brake means associated with the second power input element is engaged in timed sequence with disengagement of the second friction clutch. If such a downshift occurs at relatively high speed, the centrifugal pressure build-up in the second friction clutch servo may be sufficient to delay unduly the release of the second friction clutch, thereby causing an undesirable degree of overlap between the disengagement of the clutch and the application of the brake means. This results in a harsh speed ratio change and produces accelerated wear of the clutch and brake friction surfaces.

To overcome the adverse influence of such a centrifugal pressure build-up, I have provided an improved servo arrangement that is effective to exhaust centrifugal pressure from the clutch servo when the clutch applying pressure distribution thereto is interrupted. It is effective also to provide a cushioned engagement of the clutch upon distribution of clutch pressure to the servo.

The provision of an improved clutch servo of the type above set forth being a principal object of my invention, it is another object of my invention to provide a fluid pressure operated servo for use in a geared power transmission mechanism wherein provision is made for venting centrifugal clutch pressure through a bleed passage in one of the rotatable servo members and wherein provision also is made for blocking the exhaust passage when clutch pressure is distributed to the servo.

It is a further object of my invention to provide a fluid pressure operated clutch servo having a rotatable annular cylinder and an annular piston disposed therein, wherein venting of centrifugal clutch pressure may take place through a valve controlled bleed passage, the clutch applying force being utilized to actuate the associated valve structure.

For the purpose of describing more particularly the improvements of my invention, reference will be made to the accompanying drawings, wherein:

FIGURE 1 shows in schematic form a power transmission assembly capable of accommodating my improved clutch structure;

FIGURE 2 is a cross-sectional view showing a portion of the mechanism that is illustrated schematically in FIGURE 1; and FIGURE 3 is an enlarged partial cross-sectional view of a portion of the structure in FIGURE 2.

Referring first to FIGURES 1 and 2, numeral 10 designates generally an internal combustion engine for an automotive vehicle. It includes a crankshaft 12 that may be connected to an impeller 14 of a hydrokinetic torque converter unit. The impeller 14 is disposed in toroidal fluid flow relationship with respect to a torque converter turbine 16. A stator 18 is situated between the toroidal fluid flow exit section of the turbine 16 and the toroidal fluid flow entrance section of the impeller 14. Stator 18 is connected by means of an overruning coupling 20 to a stationary sleeve shaft 22 which in turn is anchored at 24 to a portion of a stationary transmission housing.

Turbine 16 is connected to a turbine shaft 26 which extends axially through an opening 28 formed in a forward wall 30 of the stationary transmission housing 32. A suitable bushing 34 supports shaft 26.

Connected also to the forward wall 30 is an adaptor that forms a pump chamber 36 which receives the elements of a front pump, as illustrated in FIG. 1. The driving or rotor element of the front pump is connected to a hub 38 for the impeller 14.

Shaft 26 is connected to a radially extending clutch plate 40 which is externally splined or keyed to a clutch drum 42. This drum is internally splined to facilitate a driving connection with externally splined clutch discs 44. Disposed in interdigital relationship with respect to discs 44 is a series of discs 46 which are internally splined to an externally splined clutch member 48.

Drum 42 defines an annular cylinder 50 within which is situated a movable annular piston 52. Cylinder 50 and piston 52 cooperate to define fluid pressure chamber 54.

Drum 42 is formed with a hub 56 which is journalled upon an intermediate shaft 58. This shaft 58 is splined at 60 to the previously mentioned clutch member 48.

When fluid pressure is admitted to the chamber 54, piston 52 is urged in a left-hand direction as viewed in FIGURE 2. An intermediate portion of the piston 52 engages the inner periphery of an annular Belleville spring 62. This spring is anchored at its outer periphery 64 to the interior of the clutch drum 42. An intermediate portion of the spring 62 engages a reaction shoulder 66 formed on the clutch pressure plate 68. The fluid pressure force applied to the piston 52 therefore is multiplied by the leverage ratio provided by the spring 62. The clutch plate 40 serves as a clutch pressure back-up member and it is held fast against axial movement by means of a snap-ring 70 carried in the interior of drum 42.

Thrust washers 72 and 74 are situated between clutch member 48 and plate 40 and between wall 30 and plate 40 respectively.

Connected to drum 42 is an annular externally splined extension 76 which carries internally splined clutch discs 78. Externally splined clutch discs 80 are disposed in interdigital relationship with respect to the discs 78. They are carried by internal splines formed on a brake drum 82.

A reaction clutch disc 84 also is carried by drum 82 and is held axially fast by means of a snap-ring 86.

A clutch pressure plate is shown at 88. It is capable of moving axially with respect to drum 82 although relative rotary motion thereof is inhibited by means of external splines formed on its periphery, which engage the internal splines on the drum 82. Drum 82 defines an anular cylinder 90 within which is situated an annular piston 92. This piston and cylinder cooperate to define a fluid pressure cavity 94 which may be pressurized selectively for the purpose of frictionally engaging the clutch discs 78 and 80.

Piston 92 normally is urged to a clutch release position by means of a return spring 96. This spring is anchored by an anchor member 98 that in turn is held axially fast by means of a snap-ring 100 to a hub 102 for the drum 82.

Drum 82 is formed also with an extension 104 which is keyed by means of a key 106 to a sun gear shaft 108. This shaft 108 is journalled rotatably upon shaft 58. The hub 102 in turn is journalled rotatably upon sleeve shaft 108, a suitable bushing 110 being provided for this purpose. The shaft 108 is journalled upon shaft 58 by means of needle bearing 112 and bushing 114. Shaft 108 is connected to a first sun gear 116 of a compound planetary gear unit. This sun gear engages a set of compound planet pinions 118, each pinion being journalled upon a planet pinion shaft 120 by means of needle bearings 122. Pinion shafts 120 are connected in turn to a carrier 124 having a hub sleeve shaft 126 which is journalled by means of bushing 128 upon the right hand end of intermediate shaft 58. A second set of planet pinions 130 is journalled upon pinion shafts 132 by means of needle bearings 134. Pinion shafts 132 in turn are carried by the previously described carrier 124.

Planet pinions 118 drivably engage planet pinions 130. The latter engage, in turn, a sun gear 136 which is connected to or formed integrally with shaft 58.

A ring gear 138 engages planet pinions 118. It has connected thereto a power output flange 140 which is connected to a driven sleeve shaft 142. This sleeve shaft in turn is connected to a power output member 144.

Carrier 124 includes a portion 145 which is journalled by bearing 146 to extension 104. This portion 145 forms a part of a brake drum 148 about which is disposed a brake band 150.

Secured to the interior of drum 148 is an outer coupling race 152. A cooperating inner race 154 is connected to a wall 158 that is secured at its periphery to stationary housing 32. The race 152 can be cammed. Disposed between races 152 and 154 is a series of rollers 156 which cooperate with the cammed surfaces of race 152 to establish one-way braking action between the races while accommodating relative rotation of race 152 with respect to race 154 in the opposite direction. The overrunning coupling shown in part at 156 accommodates driving torque reaction during operation of the mechanism in the lowest speed ratio. If coast braking is desired, the brake band 150 may be applied. The front clutch assembly is energized continuously during operation of any of the various forward driving speed ratios.

To establish intermediate driving speed ratio, it merely is necessary to apply a brake band 160 which is disposed about drum 82. Brake band 150 and brake band 160 can be applied by means of fluid pressure operated brake servos identified respectively in FIGURE 1 by reference characters 162 and 164.

To establish high speed ratio operation, the front brake is released and the rear clutch is applied. This locks together the sun gears for rotation in unison.

To establish reverse drive operation, it merely is necessary to release the front clutch and apply the rear clutch and also the rear brake. Under these conditions, the sun gear 116 will drive the ring gear 138 in a reverse direction while the carrier functions as a reaction member.

The passage structure that is used to distribute clutch operating pressure to the clutch servos is defined in part by a central opening 166 formed in shaft 58. Within this opening there is situated concentric fluid pressure distributor tubes 168 and 170. The interior passage defined by tube 170 communicates with radial passages 172 which in turn communicate with passages 174. These passages 174 in turn communicate with pressure chamber 154.

The annular passage defined by the concentric tubes 168 and 170 communicates with radial passage 174 and with communicating passages 176 through which fluid pressure is distributed to pressure chambers 94. The annular passage between the tube 168 and the inner wall of passage 166 forms in part the lubricating pressure distributing passage.

Disposed between piston 92 and pressure plate 88 is a Belleville spring washer 172. Its outer periphery 174 engages an annular shoulder 176 formed on pressure plate 88. In its unstressed condition, Belleville spring 172 assumes a generally conical form with its outer periphery displaced axially with respect to its inner periphery, the latter being designated generally by reference character 178.

A pressure bleed passage 180 extends axially through piston 92 at an outward region of the pressure chamber 94. The exhaust end of passage 180 communicates with an exhaust opening or port in the form of a groove 182. Situated adjacent this groove 182 is the conical surface of the Belleville spring 172.

The discs 78 and 80 of the rear clutch normally are separated from each other by dishing one set of discs with respect to the other. In this way the discs will separate from one another when clutch pressure is relieved from the rear clutch servos. The separating force of these discs is less than the force that is necessary to compress the Belleville spring 172.

When fluid pressure is admitted to the chamber 94 upon initiation of a speed ratio shift from an intermediate underdrive ratio to the direct drive high speed ratio, fluid pressure will develop in chamber 94 by reason of the restriction that is provided by passages 180. When the clutch pressure becomes sufficiently high, piston 92 moves into engagement with spring 172 thereby causing the latter to yield with a cushioning action. As this occurs, the clutch torque delivering capacity increases gradually until the spring 172 seals the end of the groove 182 thereby interrupting further bleeding of the pressurized fluid through bleed passages 180. The full pressure force developed in the rear clutch servo then is used to energize the rear clutch disc assembly after the cushioning action of the spring 172 has taken place.

When it is desired to release the rear clutch, fluid pressure distribution to the rear clutch servo is interrupted. When this occurs, spring 172 will move to the position shown in FIGURE 3, thereby uncovering annular groove 182 to permit the residual fluid within the chamber 94 to bleed out of the passages 180. This prevents a continuing clutch pressure build-up in the rear clutch by reason of the centrifugal pressure that is developed due to the high speed of rotation of the clutch parts. The rear clutch then becomes disengaged immediately, and there is no undesirable high degree of overlap between the release of the rear clutch and the application of the rear brake on a downshift from the direct-drive ratio to the intermediate under-drive ratio.

Shown also in FIGURE 1 is a governor valve 184 which is disposed within a valve body carried by the driven shaft 144. The driven shaft may be drivably connected to a vehicle road wheel, as schematically indicated in FIGURE 1.

The governor valve 184 forms a portion of an automatic control valve circuit for initiating speed ratio changes. It supplies a vehicle speed signal that is utilized by the control system.

Having thus described the preferred embodiment of my invention, what I claim and desire to secure in U.S. Letters Patent is:

In a power transmission mechanism adapted to deliver driving torque from a driving member to a driven member, a gear unit having a plurality of elements that form torque delivery paths between said driving member and said driven member, friction torque establishing means for controlling the relative motion of said elements to establish speed ratio changes, means for coupling one element of said gear unit to said driving member, another element of said gear unit being connected to said driven member, said friction torque establishing means including friction disc elements carried by relatively rotatable portions of said mechanism in adjacent relationship, a fluid pressure operated servo including an annular cylinder and a fluid pressure operated annular piston within said cylinder, said piston and cylinder cooperating to define an annular pressure chamber, said cylinder being connected to and forming a part of one of said relatively rotatable portions, an annular pressure disc carried by said one rotatable portion adjacent said disc elements, a dished annular spring disposed between said friction disc elements and said piston and including an inner peripheral margin and an outer peripheral margin, said dished spring being deformed upon application of fluid pressure to said cylinder to cushion the application of said friction torque establishing means, one margin of said spring engaging said pressure disc and the other margin thereof engaging said piston as fluid pressure is admitted to said pressure chamber, said margins normally being displaced axially relative to the axis of rotation of said rotatable portions, a flow restricting passage formed in said piston at a radial location that is intermediate the two peripheries of said spring, said passage being adapted to exhaust fluid from said chamber to prevent centrifugal pressure build-up in said chamber when said friction torque establishing means is deactivated, adjacent annular surfaces of said spring and said piston being disposed in sealing engagement when said chamber is pressurized to seal said passage, and means for normally applying to said piston a clutch disc disengaging force to interrupt the frictional driving engagement of said discs, the force that is necessary to compress said spring to a passage sealing position exceeding said disengaging force, said pressure disc being disposed directly in the line of motion of said piston.

References Cited by the Examiner
UNITED STATES PATENTS

| | | |
|---|---|---|
| 2,670,828 | 3/54 | McFarland. |
| 2,720,866 | 10/55 | Maki et al. |
| 2,770,148 | 11/56 | Wayman _____ 74—763 X |
| 2,775,330 | 12/56 | Schjolin et al. _____ 192—87 |
| 2,794,349 | 6/57 | Smirl. |
| 2,876,743 | 3/59 | Maki. |
| 3,016,121 | 1/62 | Mosbacher. |

DON A. WAITE, *Primary Examiner.*